US006585946B1

United States Patent
Bonfield et al.

(10) Patent No.: US 6,585,946 B1
(45) Date of Patent: Jul. 1, 2003

(54) PROCESS FOR THE PREPARATION OF MAGNESIUM AND CARBONATE SUBSTITUTED HYDROXYAPATITE

(75) Inventors: William Bonfield, Welwyn (GB); Iain Ronald Gibson, Aberdeen (GB)

(73) Assignee: ApaTech Limited, London (GB)

( * ) Notice: Subject to any disclaimer, the term of this patent is extended or adjusted under 35 U.S.C. 154(b) by 0 days.

(21) Appl. No.: 09/581,202

(22) PCT Filed: Dec. 17, 1998

(86) PCT No.: PCT/GB98/03817

§ 371 (c)(1),
(2), (4) Date: Aug. 8, 2000

(87) PCT Pub. No.: WO99/32400

PCT Pub. Date: Jul. 1, 1999

(30) Foreign Application Priority Data

Dec. 22, 1997 (GB) .............................................. 9727048

(51) Int. Cl.[7] .............................................. C01B 25/32
(52) U.S. Cl. ........................ 423/308; 423/309; 423/311
(58) Field of Search ................................ 423/308, 311, 423/309

(56) References Cited

U.S. PATENT DOCUMENTS 5,470,803 A * 11/1995 Bonfiield et al. ........... 423/308

5,962,028 A * 10/1999 Constantz ................... 423/308

OTHER PUBLICATIONS

Patent Abstracts of Japan, Jul. 5, 1989 & JP 01 08349 A (Kyocera Corp.), Mar. 29, 1989.

Patent Abstracts of Japan, Dec. 2, 1994 & JP 06 245992 A (Kobe Steel Ltd.), Sep. 6, 1994.

* cited by examiner

Primary Examiner—Wayne A. Langel
(74) Attorney, Agent, or Firm—Bacon & Thomas, PLLC

(57) ABSTRACT

A process for the preparation of a single phase magnesium- and carbonate-substituted hydroxyapatite composition, which process comprises the steps of (i) preparing an aqueous solution containing $CO_3^{2-}$ and $PO_4^{3-}$ ions in the substantial absence of cations other than $H^+$ ions; (ii) mixing the solution from step (i) with an aqueous calcium- and magnesium-containing solution or suspension; and (iii) collecting and drying the precipitate formed in step (ii); the ratio of (Ca+Mg/P) in the calcium- and magnesium-containing solution or suspension and the phosphorus-containing solution, when mixed together, being maintained at 1.67, or above. The product of the process is novel and comprises up to 0.5% magnesium and up to 1% of carbonate substituted into the hydroxyapatite structure and which does not contain $Na^+$ or $NH_4^+$ ions, the ratio of (Ca+Mg/P) being greater than 1.67.

19 Claims, 2 Drawing Sheets

Figure 1:
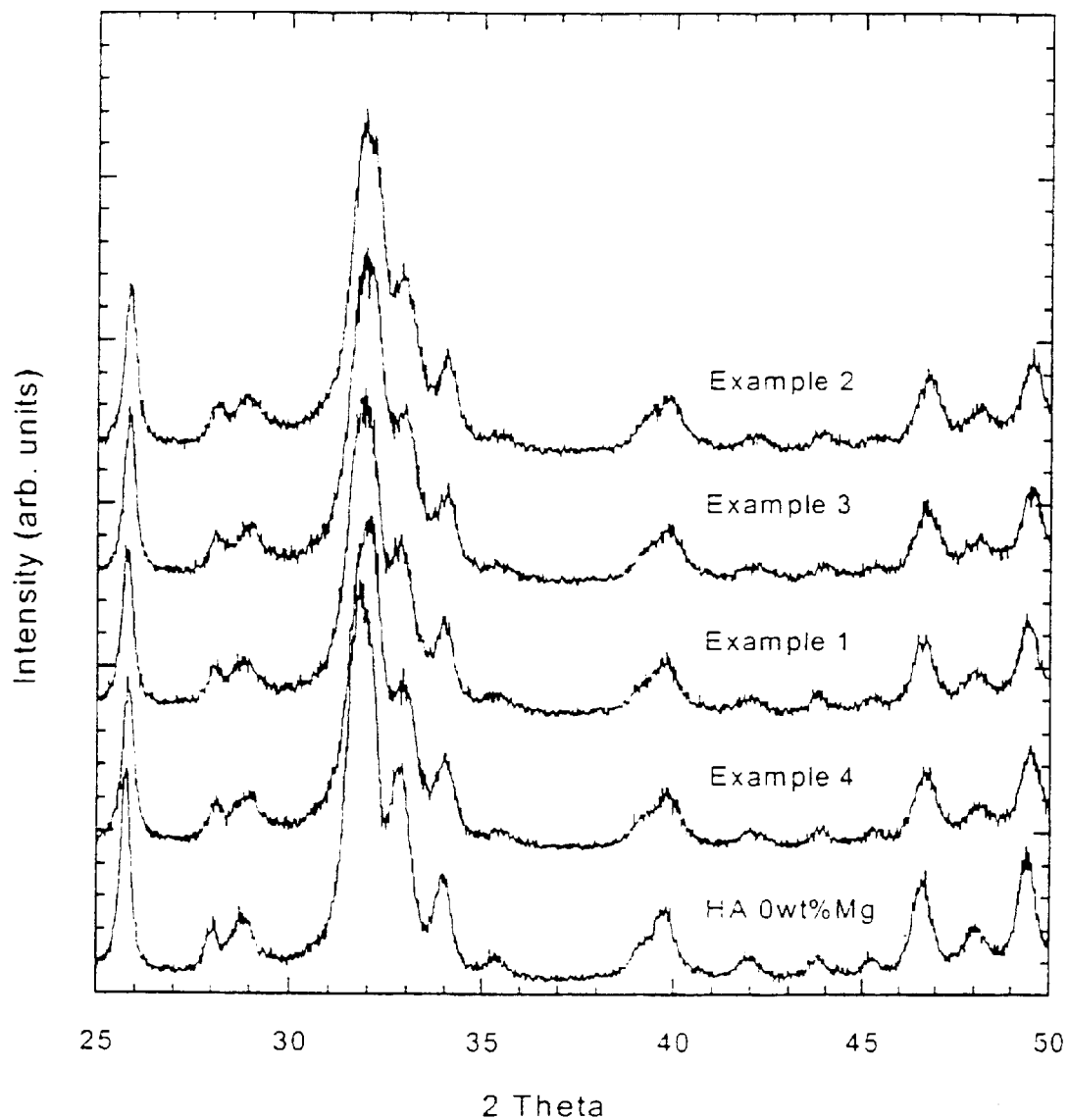

PROCESS FOR THE PREPARATION OF MAGNESIUM AND CARBONATE SUBSTITUTED HYDROXYAPATITE

The present invention relates to a process for the preparation of single phase magnesium- and carbonate-substituted hydroxyapatite compositions which are stable on heating and which do not contain sodium or ammonium ions.

Synthetic hydroxyapatite $Ca_{10}(PO_4)_6(OH)_2$ has been reported as having been used as a bone replacement material in porous, granular, plasma sprayed and dense forms. Investigations have shown hydroxyapatite to be similar structurally to bone material. However, hydroxyapatite is one of the range of stoichiometric calcium phosphate apatites. Human and animal bone have been shown to contain significant amounts of from 3 to 7 wt % of carbonate. Furthermore, human and animal bone also contains approximately 0.5% by weight of magnesium. There is evidence that the carbonate group can substitute in two sites, the phosphate and hydroxyl sites, termed B and A respectively; bone mineral being predominantly a B type apatite. As a result of this similarity in chemical composition, it is envisaged that a magnesium/carbonate-substituted hydroxyapatite will have better bioactivity than unsubstituted stoichmetric hydroxyapatite which is currently used in commercial applications such as plasma-sprayed coatings on metallic implants and porous hydroxyapatite ceramic bone substitutes. A magnesium/carbonate substituted apatite would also find application for use in chromatography and for purification, such as the removal of heavy metal ions by adsorption.

The preparation of magnesium/carbonate-substituted hydroxyapatite ceramic materials must be easy and reproducible in order to achieve commercial exploitation. Additionally, the magnesium/carbonate-substituted hydroxyapatite composition must be thermally stable such that it will not decompose to undesirable secondary phases (e.g. tricalcium phosphate or calcium oxide) upon calcining/sintering. Furthermore, during this heat treatment, the magnesium/carbonate-substituted hydroxyapatite must not loose the carbonate ions that have been substituted into hydroxyapatite structure.

Up to the present time, methods which have been reported to prepare magnesium/carbonate-substituted hydroxyapatite compositions have resulted in materials which are not stable on heating and which decompose to undesirable phases such as β-tricalcium phosphate.

e. g. A. Bigi, G. Falini, E. Foresti, M. Gazzano, A. Ripamonti and N. Roveri, "Magnesium influence on hydroxyapatite crystallisation", J. Inorg. Biochem. 49 (1993) 69–78.

R. N. Correia, M. C. F. Magalhaes, P. A. A. P. Marques and A. M. R. Senos, "Wet synthesis and characterization of modified hydroxyapatite powders", J. Mat. Sc. Mater. in Med. 7 (1996) 501–505.

R. Z. LeGeros, R. Kijkowska, C. Bautista and J. P. LeGeros, "Synergistic effects of magnesium and carbonate on properties of biological and synthesis apatites", Conn. Tiss, Res. 33(1995) 203–209.

JP-A-6245992 discloses the preparation of a hydroxyaptite containing Ca, Mg, P and/or carbonate for repairing defective bones. The method as described therein is not a precipitation method and results in materials that are not single phase after sintering, but are biphasic comprising hydroxyapatite and α- or β-$Ca_3(PO_4)_2$ or CaO. The resulting product had a (Ca+Mg/P) ratio of between 1.50 and 1.67.

Furthermore, the wet precipitation methods generally use $Na_2CO_3$ or $(NH_4)_2CO_3$ as the source of carbonate ions. This causes the problem that the unwanted additional ions $Na^+$ or $NH_4^+$ are substituted into the hydroxyapatite structure.

It is due to the problems encountered with the stability of magnesium/carbonate-substituted hydroxyapatite that this material has not been developed commercially.

We have now developed a novel process for the preparation of magnesium- and carbonate-substituted hydroxyapatite which results in a material which is stable on heating and which does not contain sodium or ammonium ions.

Accordingly, the present invention provides a process for the preparation of a single phase magnesium- and carbonate-substituted hydroxyapatite composition, which process comprises the steps of
  (i) preparing an aqueous solution containing $CO_3^{2-}$ and $PO_4^{3-}$ ions in the substantial absence of cations other than $H^+$ ions:
  (ii) mixing the solution from step (i) with an aqueous calcium- and magnesium-containing solution or suspension; and
  (iii) collecting and drying the precipitate formed in step (ii);
the ratio of (Ca+Mg/P) in the calcium- and magnesium-containing solution or suspension and the phosphorus-containing solution, when mixed together, being maintained at 1.67, or above.

The magnesium- and carbonate-substituted hydroxyapatite produced according to the present invention are believed to be novel and accordingly, in a further aspect the present invention provides a single phase magnesium- and carbonate-substituted hydroxyapatite composition which comprises up to 0.5% by weight of magnesium and up to 1% by weight of carbonate substituted into the hydroxyapatite structure and which does not contain $Na^+$ or $NH_4$ ions, the ratio of (Ca+Mg/P) being greater than 1.67. Preferably, the ratio of (Ca+Mg/P) is 1.68 or above.

In carrying out the process of the present invention the aqueous solution of step (i) may be prepared by bubbling carbon dioxide through water to form carbonic acid, and then adding phosphoric acid, $H_3PO_4$, thereto, or by adding carbon dioxide gas to water under high pressure and then adding phosphoric acid thereto. The amount of carbon dioxide absorbed by the solution can be calculated from the pH of the solution prior to the addition of $H_3PO_4$. At a pH of about 4.0 the solution will be fully saturated with carbon dioxide. Generally $H_3PO_4$ will be added to the solution of carbonic acid in order to provide the $PO_4^{3-}$ ions for reaction.

Alternatively, the aqueous solution of step (i) may be prepared by bubbling carbon dioxide through a solution of $H_3PO_4$, or adding carbon dioxide under pressure to a solution of $H_3PO_4$, in order to form $CO_3^{2-}$ ions in situ. Furthermore, $CO_2$ may be introduced as a solid which carbonates the solution as it vaporises.

The solution from step (i) of the process is mixed in step (ii) with an aqueous calcium- and magnesium-containing solution or suspension. Calcium compounds which may be used include calcium nitrate, $Ca(NO_3)_2$, or calcium hydroxide, $Ca(OH)_2$. Magnesium compounds which may be used include magnesium nitrate or magnesium acetate. Preferably the mixing will be carried out by dropwise addition of the solution from step (i) to the calcium- and magnesium-containing solution or suspension. However, bulk mixing of the solution from step (i) and the solution or suspension from step (ii) may be undertaken provided that the combined mixture is vigorously stirred in order to provide the precipitation reaction.

During the mixing in step (ii) of the process carbon dioxide may be bubbled through the mixture.

The ratio of Ca and Mg to P in the calcium- and magnesium-containing solution or suspension and the phosphorus-containing solution, when mixed together, is maintained at 1.67 or above.

Preferably the Ca and Mg/P ratio is maintained at 1.67.

After the addition of the reactants is complete, the pH of the mixture may be adjusted, if desired to pH 10 to 11 by the addition of ammonia. If ammonia is added in this manner then appropriate steps are taken to remove ammonia from the final product.

The dried precipitate from step (iii) of the process may be calcined/sintered in a wet carbon dioxide atmosphere according to the teaching of EP-0625490B. In particular, the dried precipitate may be calcined in carbon dioxide containing from 0.001 to 0.10 of grams of water per litre of gas at a temperature in the range of from 900° to 1200° C. Preferably the carbon dioxide used as the sintering atmosphere will contain from 0.01 to 0.02 grams of water per litre of gas. The sintering time will generally be up to 24 hours, preferably 10 minutes to 4 hours.

The sintering will generally be carried out at atmospheric pressure, i.e. no imposed pressure, although pressures slightly higher than atmospheric may be produced by the particular configuration of the furnace used.

The magnesium- and carbonate-substituted carbonated hydroxyapatite compositions produced according to the process of the present invention will generally comprise up to 0.5% by weight of magnesium ions and up to 1% by weight of $CO_3^{2-}$ ions, preferably 1%.

The process of the present invention enables single phase magnesium/carbonate-substituted hydroxyapatite compositions to be prepared which are stable on heating. These materials are very different from the magnesium and magnesium/carbonate-substituted apatites which have previously been reported in the literature.

The single phase magnesium- and carbonate-substituted hydroxyapatite compositions produced according to the process of the present invention are prepared in the substantial absence of cations other than $H^+$ and $Ca^{2+}$. Accordingly, the compositions do not contain other cations, such as $Na^+$ or $NH_4^+$, substituted in their structures, and thus have enhanced bioactivity. The magnesium and carbonate-substituted hydroxyapatite compositions prepared in accordance with the present invention may be used in any of the applications for which hydroxyapatite is used, for example the formation of plasma-sprayed coatings on metallic implants, the formation of porous ceramic bone substitutes, the preparation of composites with polymeric materials such as high density polyethylene, as granules or beads for packing or filling bone defects, as materials for use in chromatography or as materials for use in purification methods such as the removal of heavy metals by adsorption.

Figure 2:
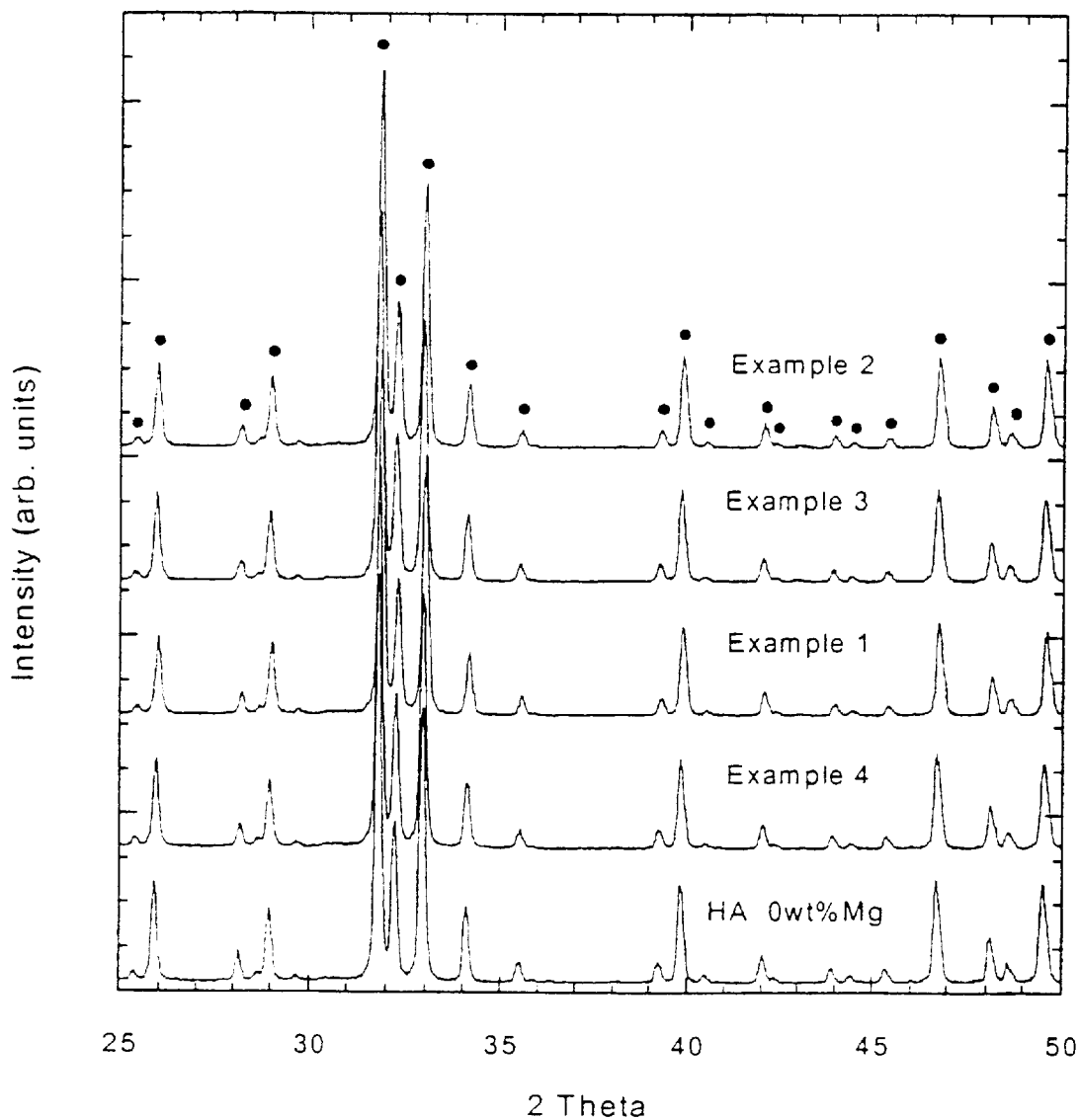

The present invention is further described hereinbelow with reference to the accompanying drawings, in which:

FIGS. 1 and 2 show X-ray diffraction data for the compositions of Examples 1 to 4, and for unsubstituted hydroxyapatite having a Ca/P ratio of 1.67.

The present invention will be further described with reference to the following Examples.

EXAMPLES 1 to 4

A suspension of calcium hydroxide was prepared by dispersing 36.92 g of $Ca(OH)_2$(AnalaR, BDH), in 1 litre of deionised water. To this was added 1.318 g of $Mg(NO_3)_2 6H_2O$ (BDH AnalaR). This suspension was stirred for 15 minutes prior to further reaction to form solution A.

Carbon dioxide ($CO_2$) gas was bubbled into 0.75 litres of deionised water over a period of 30 minutes during which time the pH of the solution decreased from approximately 7 to approximately 4. Phosphoric acid, $H_3PO_4$, (BDH GPR 85% assay) 0.3 moles (34.588 g) was added to the 0.75 litres of $CO_2$-treated water and this solution was then made up to a total of 1 litre with deionised water to form solution B.

Solution B was added dropwise to solution A, which was stirred constantly; the addition of solution B took approximately 3 hours and was performed at room temperature. After the addition of solution B, the pH of the resulting mixture was adjusted to 10.5–11 with approximately 10 ml of ammonia (BDH AnalaR). The mixture was stirred for 2 hours and then aged overnight without stirring. The aged mixture was filtered and the resulting filtercake washed with two 100 ml portions of water to remove any residual ammonia, before being dried at 80° C. overnight. The dried filtercake was crushed and ground to a fine powder having an average particle size of below 100 μm.

The procedure detailed above was repeated three times using different quantities of $Ca(OH)_2$ and $Mg(NO_3)_2$ to prepare the magnesium- and carbonate-substituted hydroxyapatites, whilst using the same amount (0.3 moles) of $H_3PO_4$.

Further details are given in Table 1 below:

TABLE 1

| Example No | Ca(moles) | $Ca(OH)_2$(g) | Mg(moles) | $Mg(NO_3)_2 6H_2O$ |
|---|---|---|---|---|
| 1 | 0.4983 | 36.920 | 0.0049 | 1.318 |
| 2 | 0.4934 | 36.557 | 0.0098 | 2.637 |
| 3 | 0.4960 | 36.753 | 0.0072 | 1.846 |
| 4 | 0.5011 | 37.130 | 0.0021 | 0.527 |

The carbonate-substituted hydroxyapatites prepared as described above were thermally stable to 900° to 1200° C. in a $CO_2/H_2O$ atmosphere. Above these temperatures, partial decomposition to hydroxyapatite and calcium oxide/calcium carbonate was observed.

The results of the XRF and CHN analysis are given in Table 2 below:

TABLE 2

| Example No | (Ca + Mg)/P (cal) | wt % Mg (cal) | (Ca + Mg)/P (XRF) | wt % $CO_3$ (CHN) | wt % Mg (XRF) |
|---|---|---|---|---|---|
| 1 | 1.67 | 0.25 | 1.70 | 1.0 | 0.24 |
| 2 | 1.67 | 0.50 | 1.71 | 0.4 | 0.46 |
| 3 | 1.67 | 0.35 | 1.69 | 0.8 | 0.33 |
| 4 | 1.67 | 0.10 | 1.70 | 0.9 | 0.10 |

Chemical analysis, by CHN analysis, of the as prepared magnesium/carbonate-substituted hydroxyapatite powders and the resulting heated/sintered material produced in the present invention showed that no nitrogen (and therefore ammonia) was present.

The calculated values and the measured values of the Mg content are very similar. The measured values of (Ca+Mg)/P are all greater than the molar ratios values as calculated and greater than the molar ratio values of Ca/P for hydroxyapatite of 1.67. Some of the carbonate present must be substituted on the $PO_4$ site (B-type substituted), therefore resulting in a molar ratio represented as (Ca+Mg)/(P+C). If there was no B-type substitution of carbonate ions, then the high molar ratio of (Ca+Mg)/P would suggest that the samples were Ca and/or Mg rich.

FIGS. 1 and 2 show X-ray diffraction data for the prepared and calcined/sintered (1000° C. $CO_2/H_2O$) carbonate-substituted hydroxyapatite samples of Examples 1 to 4, and for unsubstituted hydroxyapatite having a Ca/P ratio of 1.67. The X-ray diffraction data does not show any peaks attributable to calcium oxide or magnesium oxide second phases, suggesting that the molar ratios of the magnesium/carbonate-substituted hydroxyapatite must be close to pure HA.

The effect of increasing the Mg content on the as-prepared material is a very small increase in the width of the diffraction peaks, corresponding to a decrease in crystalline size (FIG. 1). No addition phases were observed in any of the diffraction patterns for the as-prepared materials. The X-ray diffraction patterns of the calcined/sintered samples containing Mg show only peaks corresponding to HA.

What is claimed is:

1. A process for the preparation of a single phase magnesium- and carbonate-substituted hydroxyapatite composition, which process comprises the steps of
   (i) preparing an aqueous solution containing $CO_3^{2-}$ and $PO_4^{3-}$ ions in the substantial absence of cations other than $H^+$ ions:
   (ii) mixing the solution from step (i) with an aqueous calcium- and magnesium-containing solution or suspension;
   (iii) collecting and drying the precipitate formed in step (ii); and
   (iv) calcining the dried precipitate from step (iii) in carbon dioxide containing from 0.001 to 0.10 grams of water per litre of gas at a temperature of from 900° to 1200° C.
   the ratio of (Ca+Mg/P) in the calcium- and magnesium-containing solution or suspension and the phosphorus-containing solution, when mixed together, being maintained at 1.67, or above.

2. A process as claimed in claim 1 wherein the aqueous solution of step (i) is prepared by bubbling $CO_2$ through water to obtain a solution of carbonic acid and then adding $H_3PO_4$ thereto.

3. A process as claimed in claim 2 wherein the carbonic acid solution has a pH of about 4 before addition of $H_3PO_4$.

4. A process as claimed in claim 1 wherein the solution from step (i) is added dropwise with stirring to the aqueous calcium- and magnesium-containing solution or suspension.

5. A process as claimed in claim 1 wherein the solution or suspension used in step (ii) is prepared from calcium nitrate or calcium hydroxide and magnesium nitrate or magnesium acetate.

6. A process as claimed in claim 1 wherein $CO_2$ is passed through the solution from step (i) during mixing step (ii).

7. A process as claimed in claim 1 wherein the ratio of Ca+Mg/P in the calcium- and magnesium containing solution or suspension and the phosphorus-containing solution, when mixed together, is 1.67.

8. A process as claimed in claim 1 wherein the carbonated hydroxyapatite composition comprises up to 1% by weight of $CO_3^{2-}$ ions.

9. A process as claimed in claim 1 wherein the magnesium content of the magnesium- and carbonate-substituted hydroxyapatite is up to 0.5% by weight of Mg.

10. A process as claimed in claim 2 wherein the solution from step (i) is added dropwise with stirring to the aqueous calcium- and magnesium-containing solution or suspension.

11. A process as claimed in claim 3 wherein the solution from step (i) is added dropwise with stirring to the aqueous calcium- and magnesium-containing solution or suspension.

12. A process as claimed in claim 2 wherein the solution or suspension used in step (ii) is prepared from calcium nitrate or calcium hydroxide and magnesium nitrate or magnesium acetate.

13. A process as claimed in claim 3 wherein the solution or suspension used in step (ii) is prepared from calcium nitrate or calcium hydroxide and magnesium nitrate or magnesium acetate.

14. A process as claimed in claim 4 wherein the solution or suspension used in step (ii) is prepared from calcium nitrate or calcium hydroxide and magnesium nitrate or magnesium acetate.

15. A process as claimed in claim 2 wherein $CO_2$ is passed through the solution from step (i) during mixing step (ii).

16. A process as claimed in claim 3 wherein $CO_2$ is passed through the solution from step (i) during mixing step (ii).

17. A calcined single phase magnesium- and carbonate-substituted hydroxyapatite composition which comprises up to 0.5% by weight of magnesium and up to 1% by weight of carbonate substituted into the hydroxyapatite structure and which does not contain $Na^+$ or $NH_4^+$ or ions, the ratio of (Ca+Mg/P) being greater than 1.67.

18. A calcined single phase magnesium- and carbonate-substituted hydroxyapatite composition as claimed in claim 17 wherein the ratio of (Ca+Mg/P) is 1.68 or above.

19. A calcined single phase magnesium- and carbonate-substituted hydroxyapatite composition whenever prepared by a process which comprises the steps of
   (i) preparing an aqueous solution containing $CO_3^{2-}$ and $PO_4^{3-}$ ions in the substantial absence of cations other than H+ ions:
   (ii) mixing the solution from step (i) with an aqueous calcium- and magnesium-containing solution or suspension;
   (iii) collecting and drying the precipitate formed in step (ii); and
   (iv) calcining the dried precipitate from step (iii) in carbon dioxide containing from 0.001 to 0.10 grams of water per litre of gas at a temperature of from 900° to 1200° C. the ratio of (Ca+Mg/P) in the calcium- and magnesium-containing solution or suspension and the phosphorus-containing solution, when mixed together, being maintained at 1.67, or above.

* * * * *